United States Patent [19]
Cromwell

[11] 3,938,814
[45] Feb. 17, 1976

[54] BEARING MEMBER HAVING A WEAR RESISTANT COATING ON ITS BEARING FACE

[75] Inventor: John E. Cromwell, Baltimore, Md.

[73] Assignee: Koppers Company, Inc., Pittsburgh, Pa.

[22] Filed: Sept. 23, 1974

[21] Appl. No.: 508,245

[52] U.S. Cl.............. 277/235 A; 29/198; 29/196; 427/34
[51] Int. Cl.$^2$.................. B32B 15/18; F16J 9/00
[58] Field of Search.......... 117/93.1 PF, 105.2, 105; 277/235 A, DIG. 6, 96 A

[56] References Cited
UNITED STATES PATENTS

| | | | |
|---|---|---|---|
| 3,419,415 | 12/1968 | Dittrich | 117/93.1 PF |
| 3,615,099 | 10/1971 | Prasse | 277/235 A |
| 3,617,349 | 11/1971 | Prasse | 277/235 A |
| 3,814,447 | 6/1974 | Prasse et al. | 277/235 A |

Primary Examiner—Robert I. Smith
Attorney, Agent, or Firm—Oscar B. Brumback; Boyce C. Dent

[57] ABSTRACT

A bearing member such as a piston ring for internal combustion engines having a wear resistant alloy coating applied to its wear surface by plasma spraying an aggregate mixture of particles thereon. The mixture is made by first alloying carbon, silicon, chromium, nickel, iron, and boron together to form intermetallic brazing and binding alloy particles and by alloying substantially 75% cobalt and 25% molybdenum to form cobalt-molybdenum alloy particles, for mixing with individual particles of pure molybdenum. These three different particles form the aggregate mixture to be sprayed on the bearing surface.

11 Claims, 6 Drawing Figures

U.S. Patent  Feb. 17, 1976  3,938,814
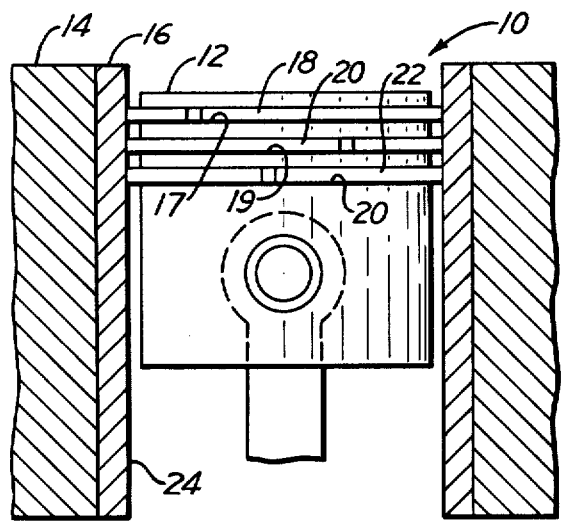
Fig.1
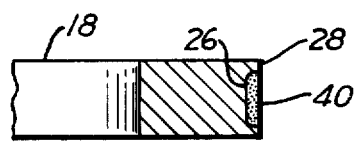
Fig.2
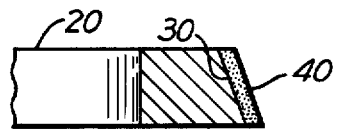
Fig.3
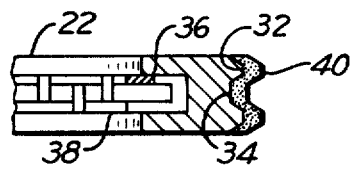
Fig.4
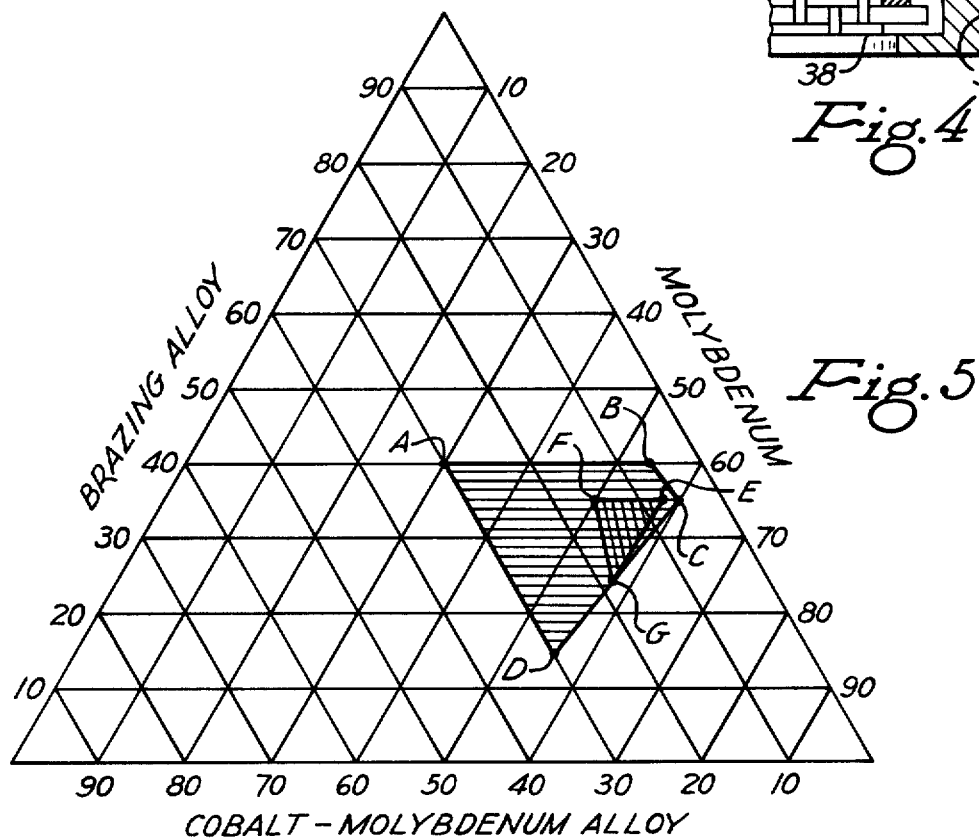
Fig.5
| MATERIAL | A | B | C | D | E | F | G |
|---|---|---|---|---|---|---|---|
| BRAZING | 40 | 40 | 35 | 15 | 35 | 35 | 25 |
| MO | 30 | 53 | 60 | 55 | 58.3 | 50 | 58.3 |
| CO-MO | 30 | 7 | 5 | 30 | 6.7 | 15 | 16.7 |
Fig.6

BEARING MEMBER HAVING A WEAR RESISTANT COATING ON ITS BEARING FACE

BACKGROUND OF THE INVENTION

1. Field of the Invention

This invention relates generally to bearing members such as piston rings and more particularly to a coating for the wear surface of the bearing members to produce a wear resistant, oxidation resistant, and scuff resistant coating thereon.

2. Description of the Prior Art

High temperatures in today's internal combustion engine adversely affect the wear characteristics of the piston ring and cylinder bore. The higher the engine's R.P.M., the greater the frictional heat that is created between the piston ring and the cylinder bore. This increase in frictional heat is in addition to the normal increase in temperature due to greater compression in the engine. Because the piston ring reciprocates at such high velocity against the cylinder bore, and at such high operating temperatures, the rubbing surfaces of the piston ring and the cylinder bore tend to wear rapidly. Accordingly, great advances have been made in applying metallic coatings to the wear surface of the piston ring, such coatings being designed to decrease the friction between the piston ring and the cylinder bore.

Many flame sprayable compositions have been developed for coating the wear surfaces of piston rings. For example, one widely used composition includes a high percentage of molybdenum alloyed with various other binding elements such as shown in Prasse et al U.S. Pat. No. 3,690,686. Such coatings have improved the wear resistance of piston rings that operate at relatively low and intermediate temperatures, but it has been found that molybdenum oxides form at temperatures above 450°F which are hard, abrasive, brittle and tend to dissociate from the coating. These oxides have an adverse effect on the soft cylinder bore and often causes damage by abrading the soft surface of the cylinder bore which reduces the life of the piston ring and cylinder bore.

Molybdenum has a body-centered crystalline structure which is essentially cubical in shape which is rather abrasive when used as a rubbing wear surface. On the other hand, cobalt has a hexagonal close-packed crystalline structure which is less abrasive than molybdenum. As long as cobalt maintains its hexagonal crystalline structure, abrasive oxides are not formed. However, cobalt exists in both hexagonal and cubic crystalline forms. Cobalt maintains its hexagonal crystalline form up to temperatures of about 752°F and then transforms into a cubic crystalline form similar to molybdenum.

It has also been learned that the temperature at which crystalline transformation of cobalt from hexagonal to body centered cubic occurs can be altered by selectively alloying it with molybdenum. For example, the addition of 25% molybdenum to cobalt can increase the transformation temperature appreciably. Thus, a coating containing cobalt alloyed with molybdenum would be extremely desirable in engines that reach temperatures above 752°F.

However, it has been found that by adding just molybdenum and other metals the desired results of low wear is not obtained automatically. Usually, intermettalic brazing and binding alloy particles are used as the starting material which serves as a bonding agent in the final coating and also forms a fairly good wear resistant coating in itself. To these alloyed particles are added specific amounts of other materials in an attempt to obtain beneficial characteristics of the added materials. Thus, experimentation must be conducted in order to obtain a coating that will give the maximum wear resistance and maximum life to the piston ring. The mere addition of cobalt and molybdenum particles to an intermetallic brazing and binding alloy and then plasma spraying the resulting mixture onto the bearing surface of the piston ring will not necessarily create the desired results. It has been found through experimentation and research that the molybdenum, cobalt, and the intermetallic brazing and binding alloy must be formed as specific particles and in specific amounts in order to form a good wear resistant coating. Cobalt is a relatively expensive metal as compared to molybdenum but, since its wear properties are so much better than molybdenum, it is desirable to have a coating that contains cobalt but which will be competitive in the industrial market.

We have discovered through experimentation that the wear resistant properties of a coating can be greatly improved by alloying molybdenum with cobalt to form one particle; alloying an intermetallic brazing and binding compound to form another particle; and then alloying the two particles with a particle of pure molybdenum. The percentage of molybdenum used in the final coating is extremely important to prevent formation of molybdenum oxides above 450°F which results in an extremely abrasive coating. Therefore, the percentages of molybdenum and cobalt used in the final coating must be balanced in order to achieve high wear resistance and still produce a piston ring that will be competitive on the market.

We have also discovered that alloying of the material in the final coating can best be achieved by properly preparing the mixture to be sprayed. However, the particles in the final coating should be alloyed only with the surfaces of the adjacent particles thereby leaving distinct particles of specific materials intermixed on the final coating. This will result in a highly wear resistant coating.

SUMMARY OF THE INVENTION

Accordingly, an object of the present invention is to provide a bearing member with a coating on its wear surface which is highly wear resistant at substantially high temperatures.

This is generally accomplished by providing a bearing member with a wear resistant coating which is applied to a wear surface thereon by plasma flame spraying a mixture of particles on the wear surface. The mixture comprises three types of individual particles. The first particle is an intermetallic brazing and binding alloy consisting of carbon, silicon, chromium, nickel, iron, and boron and makes up approximately 15 to 40% of the entire mixture. The second particle is a cobalt molybdenum alloy which makes up approximately 5% to 30% of the entire mixture. The cobalt molybdenum alloy contains substantially 75% cobalt alloyed with substantially 25% molybdenum. The third particle is pure molybdenum which makes up approximately 30 to 60% of the entire mixture.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike:

FIG. 1 is a sectional view of a cylinder and piston assembly showing the piston with a top ring, an intermediate compression ring, and a bottom oil control ring;

FIG. 2 is an enlarged cross-sectional view of the top compression ring of FIG. 1 showing the piston ring with a circumferentially extending groove filled with the coating of the present invention;

FIG. 3 is an enlarged cross-sectional view of the intermediate compression ring of FIG. 1 showing the piston ring with a slanted face covered with the coating of the present invention;

FIG. 4 is an enlarged cross-sectional view of the bottom oil control ring of FIG. 1 showing a pair of radially extending and axially spaced bearing faces covered with the coating of the present invention and also showing an expander assembly for expanding the piston ring into contact with wear surface of the cylinder bore;

FIG. 5 is a phase diagram illustrating the maximum percentage by weight ranges of the ingredients of the mixture that will produce the best coating on the wear surface of each of the piston rings of FIG. 1; and FIG. 6 is a table setting forth the ranges of the ingredients of the mixture within the boundaries of points A, B, C, and D of FIG. 5 and also showing the preferred range E and alternate ranges F and G.

DESCRIPTION OF THE PREFERRED EMBODIMENT

FIG. 1 illustrates a portion of a piston and cylinder assembly denoted generally by numeral 10. Assembly 10 includes a piston 12 within a cylinder 14. Piston 12 includes three axially spaced and circumferentially piston ring grooves 17, 19, and 21 extending around the periphery of piston 12. Three circumferentially split piston rings 18, 20, and 22, are respectively placed within the three piston ring grooves. Top piston ring 18 includes an outer circumferentially extending groove 26; the middle ring 20 is an intermediate compression ring having a tapered face; and, the bottom ring 22 is an oil control ring which is expanded radially outward by a conventional U-shaped expander 38.

Top compression ring 18 is generally made of a ductile cast iron and, as illustrated in FIG. 2, includes a groove 26 in which is deposited coating 40 of this invention to form a wear resistant bearing face on ring 18 in contact with the wall 24 of cylinder 14.

Intermediate compression ring 20 includes a tapered face 30, as shown in FIG. 3, on which is deposited coating 40 of this invention to form a wear resistant and bearing face thereon.

The oil control ring 22 shown in FIG. 4 includes a pair of axially spaced bearing faces 32 extending radially outward thereby forming channel 34 therebetween. Control ring 22 further includes an inner channel 36 extending around the inner periphery of ring 22. A conventional U-shaped expander 38 fits within inner channel 36 and expands piston ring 22 radially outward so that bearing faces 32 will bear against the wall 24 of cylinder 14. The coating 40 of this invention may also be deposited on bearing faces 32 of piston ring 22 to provide wear resistant surfaces thereon.

Therefore, it can be seen that the bearing faces of each of the rings may be coated with coating 40 of this invention. The bearing faces on each of the rings slideably engages the wall 24 and the rings are compressed therein in accordance with the usual practice so as to be expanded tightly against the wall 24 to maintain a good sealing engagement therewith.

Although three piston rings have been shown in FIG. 1, it should be understood, however, that any number of different configurations of rings may be used. Other types of piston rings may also be used with piston 12 such as, for example, rectangular flat faced rings with or without grooves or keystone piston rings with or without grooves. The faces of the piston ring not in contact with the cylinder wall may also be coated with a wear resistant coating although it is not usually necessary to do so.

The engine cylinder 14 preferably includes a cylinder liner 16 having a liner bearing surface 24 that is made from a grey iron casting having a carbon content of about 3.0 – 3.5% by weight, a silicon content of about 1.8 – 2.2% by weight, a manganese content of about 0.6 – 1.0% by weight, a maximum sulfur content of about 0.15% by weight, and a maximum phosphorus content of about 0.50% by weight. Such typical grey iron compositions for use as liners in engine cylinders are designated as SAEG-3500 and G-4500 materials.

The starting mixture that forms coating 40 is applied to the piston rings by a well-known and conventional plasma flame spray technique using a plasma jet gun. The plasma flame of such a gun produces temperatures of approximately 32,000°F and such temperatures are achieved by applying electrical energy to a gas mixture (such as, for example, a 10 to 1 nitrogen to hydrogen mixture) which causes the gas molecules of the gas mixture to dissociate into an atomic stage. The gases are then ionized, producing electrons and charged ions. The electrical energy absorbed by such ionization is converted to heat energy by deionization of the gas. The coating particle mixture is directed into the plasma flame by a carrier gas, for example, nitrogen. The particles of the mixture are propelled by the gas escaping through the nozzle of the gun as a stream of molten particles. The nozzle is aimed at the surface to be coated so that the molten particles impinge thereon. The molten particles solidify to provide a continuous and adherent coating 40 on the surface that results from a combination of mechanical and atomic bonding at the interface of coating 40 and the substrate body of piston rings 18, 20, and 22 and between the particles themselves to form an alloy of the ingredients of the starting mixture.

In accordance with the invention, the starting mixture generally consists of a loose mixture of thoroughly mixed finely divided and generally spherical particles of the required physical composition. The mixture contains particles of particular amounts by weight of an intermetallic brazing and binding alloy consisting principally of nickel, a cobalt molybdenum alloy, and pure molybdenum particles. Preferably, the mixture is blended from a combination of commercially available flame sprayable particles or powders or which can be prepared on order from various sources as will be discussed in greater detail later. The diameter of the particles may vary from 5 to 100 microns but the preferred diameter is 10 to 74 microns, it being understood that the particles are not perfectly spherical. The particle size distribution of the mixture can be readily ascertained by screening the particles in accordance with AFTM test B214. The various particles should have the general overall shape and configuration of conventional plasma flame sprayable compositions and should be as uniform in diameter as possible. It has been found that when the particles of the preferred size are flame sprayed on the surface of the piston ring face, proper alloying of the three mixed particles is achieved to produce the desired wear resistant surface.

The starting mixture contains particles of an intermetallic brazing and binding alloy consisting principally of nickel, a cobalt molybdenum alloy, and pure molybdenum particles. The final coating is essentially a partially alloyed mixture of the three ingredients. The three ingredients are not completely alloyed with each other but are bound in a fused and alloy mixture wherein each of the ingredients is individually distinguishable in the final coating. However, each ingredient has an alloyed phase with the other ingredients thereby providing a continuously bonded coating that is extremely wear resistant.

The first ingredient of the mixture is essentially an intermetallic brazing and binding alloy powder in which each particle has the following chemistry in parts by weight:

| | |
|---|---|
| Carbon | .18 to .48 parts |
| Silicon | .60 to 1.60 parts |
| Chromium | 2.58 to 6.88 parts |
| Nickel | 10.5 to 28.0 parts |
| Iron | .60 to 1.60 parts and |
| Boron | .54 to 1.44 parts |

These individual elements are mixed and then melted to form a complete alloying of the elements, the alloy then being processed in any conventional manner to form particles ranging from 10 to 74 microns in diameter with the cross section of a typical particle being generally spherical. When this particle is plasma flame sprayed onto a metal substrate by itself, the resulting coating has essentially the same composition as the powder and forms a very hard coating which has good wear properties at relatively high temperatures. The first ingredient is readily commercial available and may be obtained from a number of commercial sources such as, for example, Refractory Metals, Inc., P. O. Box 34606, Houston, Tx. 77034 and may be purchased under the name RMI No. 60.

The second ingredient of the mixture is essentially a cobalt molybdenum alloy. The cobalt molybdenum particle is essentially an alloy of 75% cobalt alloyed with 25% molybdenum. The cobalt and molybdenum elements are thoroughly mixed and then melted to form an alloy of the two metals. The resulting alloy is then processed in a conventional manner to form particles of substantially 10 to 74 microns in diameter. Since this second particle is an alloy of 75% cobalt and only 25% molybdenum, the resulting crystalline structure of the alloy is essentially hexagonal in shape, the alloy has inherently good wear properties at high temperatures and has a low coefficient of friction. This contributes to good wear properties at high temperatures because the cobalt and molybdenum alloyed particles will retain their hexagonal crystalline structure even at high temperatures as previously explained. This second ingredient may be obtained from a number of sources by specification, that is, by specifying that the powder is an alloy 75% cobalt and 25% molybdenum having a diameter between 10 and 74 microns. The powder may be obtained from GTE Sylvania Corp., Precision Materials Group, Chemical and Metallurgical Division, 4700 Parkside Ave., Philadelphia, Pa. 19131.

The third ingredient of the mixture is essentially a spherical particle of pure molybdenum. The molybdenum particle should have a particle size of between 10 and 74 microns in diameter. This third ingredient may also be obtained from GTE Sylvania Corp., (Sylvania powder 450) and from Wah Chang Corp., 7300 West Decatur Highway, Huntsville, Al. 35806 (MSP-200 powder).

The three ingredient particles are blended together in a conventional blender at the preferred weight ratio to form the starting mixture for plasma flame spraying onto the wear surface to be coated. The following table 1 sets forth the minimum, preferred, and maximum amounts of the three ingredients by weight in the starting mixture.

TABLE 1

| | Blends (Percent by Weight) | | |
|---|---|---|---|
| | MINIMUM | PREFERRED | MAXIMUM |
| 1ST INGREDIENT (INTERMEDIATE BRAZING AND BINDING ALLOY PARTICLES) | 15 | 35 | 40 |
| 2ND INGREDIENT (COBALT MOLYBDENUM ALLOY PARTICLES) | 5 | 6.7 | 30 |
| 3RD INGREDIENT (MOLYBDENUM PARTICLES) | 30 | 58.3 | 60 |

The starting mixture may be manufactured or blended from any commercially available composite powders so long as the ingredients are formed as previously described. The foregoing table illustrates the manner in which the plasma flame sprayable mixtures of the invention may be derived from commercially available materials. The minimum and maximum weight limits of the plasma flame sprayable ingredients are the critical limits of the mixture.

FIG. 5 is a phase diagram showing the percentage by weight of each of the ingredients wherein each ingredient and its percent weight is shown on each side of the phase diagram. The shaded area within the phase diagram which is bounded by points A, B, C, and D is the percentage range limit by weight of coating 40. As shown in FIG. 5, and in table form in FIG. 6, Point A shows a limit of 40% for the intermetallic brazing and binding alloy particles, 30% for the pure molybdenum particles, and 30% for the cobalt molybdenum alloy particles, Point B shows a limit of 40% for the intermetallic brazing and binding alloy particles, 53% for the pure molybdenum particles, and 7% for the cobalt molybdenum alloy particle. Point C shows a limit of 35% intermetallic brazing and binding alloy particles, 60% for the pure molybdenum particles, and 5% for the cobalt molybdenum alloy particles. Point D shows a limit of 15% for the intermetallic brazing and binding alloy particles, 55% for the pure molybdenum particles, and 30% for the cobalt molybdenum particles.

Referring again to FIG. 5, within the shaded area bounded by points A, B, C, and D, a second shaded area bounded by points E, F, and G shows the preferred range of the ingredients. Point E shows a preferred limit of 35% for the intermetallic brazing and binding alloy particles, 58.3% for the pure molybdenum particles, and 6.7% for the cobalt molybdenum alloy particles. Point F shows a preferred limit of 35% for the intermetallic brazing and binding alloy particles, 50% for pure molybdenum particles, and 15% for the cobalt molybdenum alloy particles. Point G shows a preferred limit of 25% for the intermetallic brazing and binding alloy particles, 58.3% for the pure molybdenum particles, and 16.7% of the cobalt molybdenum alloy particles.

It has been found through experimentation and engine testing that the preferred coating includes the individual ingredients in the proportions shown at Point E in the phase diagram of FIG. 5 and in the table of FIG. 6. Although point E is the preferred range for the percentage by weight of the ingredients for the starting mixture, it is believed that alternate mixtures having the proportion of ingredients specified at points F and G will also produce substantially the same desired wear properties that the proportion of point E produces.

As stated above, Point E sets forth the preferred proportion for each of the three ingredients. The preferred percentages at point E are shown below in Table 2, and will hereafter be referred to as coating K-1000F.

TABLE 2

| (K-1000 F Coating) | |
|---|---|
| 1ST INGREDIENT — | 35% INTERMETALLIC BRAZING AND BINDING ALLOY PARTICLES, CONSISTING OF BY WEIGHT:<br>.4% CARBON;<br>1.4% SILICON;<br>6.0% CHROMIUM;<br>24.5% NICKEL;<br>1.4% IRON; AND<br>1.3% BORON |
| 2ND INGREDIENT — | 6.7% COBALT MOLYBDENUM ALLOY PARTICLES CONSISTING OF BY WEIGHT:<br>5.0% COBALT AND<br>1.7% MOLYBDENUM |
| 3RD INGREDIENT — | 58.3% PURE MOLYBDENUM PARTICLES |

As stated above, although point E (K-1000F coating) represents the preferred proportions for the mixture of the particles, the proportions of point F may be used as an alternate mixture. The percentage by weight at point F (hereinafter designated as K-1000H coating) of each of the ingredients is shown below in Table 3.

TABLE 3

| (K-1000 H Coating) | |
|---|---|
| 1ST INGREDIENT — | 35% INTERMETALLIC BRAZING AND BINDING ALLOY PARTICLES CONSISTING OF BY WEIGHT:<br>.4% CARBON;<br>1.4% SILICON;<br>6.0% CHROMIUM;<br>24.5% NICKEL;<br>1.4% IRON; and<br>1.3% BORON |
| 2ND INGREDIENT — | 15% COBALT MOLYBDENUM ALLOY PARTICLES CONSISTING OF BY WEIGHT:<br>11.3% COBALT AND<br>3.7% MOLYBDENUM |
| 3RD INGREDIENT — | 50% PURE MOLYBDENUM PARTICLES |

TABLE 3-continued

Point G shows the percentage weights of a second alternative mixture to the preferred coating K-1000F. The percentage by weight of the ingredients at point G (hereinafter designated as K-1000I coating) is shown below in Table 4.

TABLE 4

| (K-1000 I Coating) | |
|---|---|
| 1ST INGREDIENT — | 25% INTERMETALLIC BRAZING AND BINDING ALLOY PARTICLES CONSISTING OF BY WEIGHT:<br>.3% CARBON;<br>1.0% SILICON;<br>4.3% CHROMIUM;<br>17.5% NICKEL;<br>1.0% IRON; AND<br>.9% BORON |
| 2ND INGREDIENT — | 16.7% COBALT MOLYBDENUM ALLOY PARTICLES CONSISTING OF BY WEIGHT:<br>12.5% COBALT AND<br>4.2% MOLYBDENUM |
| 3RD INGREDIENT — | 58.3% PURE MOLYBDENUM PARTICLES |

The preferred coating K-1000 F (Point E) preferably has a porosity of between 0 and 15%. Conventional plasma flame sprayed molybdenum coatings, that is, those having a substantial amount of molybdenum, generally have a porosity of between 15 and 30%. It appears that high porosity in the surface of the coating increases corrosion and that low porosity reduces corrosion. However, a certain amount of porosity is needed in the face of the coating in order to retain a certain amount of lubricating oil used in the engine to provide a lubricated surface between the coating on the piston ring and the wall of the cylinder bore to reduce friction. It has been found that coating K-1000F of the present invention has a porosity of substantially 5%. This 5% porosity in the coating face will reduce corrosion and at the same time retain sufficient lubricating oils.

A number of top compression rings 18 were constructed substantially the same as that shown in FIG. 2 and were prepared with a coating 40 prepared from a mixture of ingredients having the percentage by weight combination as shown at point E in FIG. 5 and table 2 and designated K-1000F. The piston rings were prepared for testing in an internal combustion diesel engine. The top compression rings 18 were prepared in the following manner. The bearing surfaces of piston rings 18 were preconditioned by well-known techniques of degreasing and grit blasting. The piston rings 18 were stacked on an arbor with their side faces tightly pressed against each other and with the outer or bearing surfaces fully exposed and coated with K-1000F coating mixture by using a plasma jet gun during rotation of the arbor. The starting mixture was sprayed on the piston ring to the desired thickness of the coating, about 0.016 inches. The coating thickness depends on the geometry of the part to be coated and the type of finish required; however, a coating of approcimately 0.012 – 0.020 inches in thickness is usually applied. Subsequently, the coating was ground flat by conventional grinding techniques to a thickness of about 0.006 – 0.008 inches although in some cases the coating is crowned about 0.0002 – 0.0006 inches in a conventional manner. The final coating K-1000F was hard and adhered to the bearing surface of the piston ring. The piston ring was then ready for use in a conventional manner in the internal combustion diesel engine as the top compression ring.

In order to compare the results obtained by use of coating K-1000F of the present invention, duplicate top compression rings were also prepared with a molybdenum base alloy coating that is used extensively today and which hereinafter will be designated K-1000C coating. Coating K-1000C is a mixture of two different ingredients that are alloyed together by the conventional flame spray method thereby providing an alloy coating on the piston ring bearing face. The first ingredient of K-1000C is a molybdenum particle and the second ingredient is an intermetallic binding alloy such as previously described. The coating K-1000C sprayed on the other top compression rings was a mixture by weight of 75% molybdenum particles and 25% intermetallic binding alloy. The intermetallic binding alloy consisted by weight of 0.3% carbon, 1.0% silicon, 4.3% chromium, 17.5% nickel, 1.0% iron, and 0.9% boron. The particles were substantially the same size as those of the mixture for K-1000F.

The mixture of K-1000C was flame sprayed on the surface of the piston rings under the same conditions and in the same manner as the coating K-1000F. The K-1000C coating contains no cobalt and contains an alloy of only two particles, the pure molybdenum particles and the intermetallic binding alloy particles; thus the K-1000C mixture does not contain a cobalt molybdenum alloy particle as does mixture K-1000F of the present invention.

In the first test, three top compression piston rings with the K-1000F coating of the present invention were installed in three pistons of a six cylinder diesel engine and three top compression piston rings with the K-1000C coating were installed in the other three pistons of the engine. The engine was run at 2,000 RPM and developed 430 HP and 191 BMEP (break mean effective pressure). In the first test, the engine was run for approximately 597.6 hours with the piston rings having the K-1000F coating and was run for approximately 400 hours with the piston rings coated with the K-1000C coating. The results obtained were computed for 600 hours so that results obtained at 400 hours and 597.6 hours were extrapolated to the 600 hour mark. The piston rings were run against soft cylinder liners. After the first 400 hours, the piston rings with the K-1000C coating were removed from the engine and after 597.6 hours the piston rings having the K-1000F coating were removed. The change in end clearance of the piston rings was measured to determine the amount of wear of the coatings and the increase in diameter of the liners was measured to determine the wear of the bores.

The end clearance increase of a piston ring is determined by measuring the gap of each piston ring with the ring in a gauge having a diameter equal to the diameter of the cylinder liner. The gap of the piston ring is measured before and after engine testing and the difference between these two measurements determines the end clearance increase. Cylinder liner wear is determined by measuring the diameter of the cylinder liners before and after engine testing at the turn around point of the top compression rings and taking the difference between these two measurements. The greatest amount of wear occurs at the turn around point.

The results obtained were quite remarkable when extrapolated to 600 hours. The average end clearance increase of the three piston rings having the K-1000F coating was 0.0049 inches, while the end clearance increase of the piston rings having the K-1000C coating was 0.0063 inches. Thus, in the first test, it can be seen that the K-1000F coating of the present invention wore less than the K-1000C coating. The cylinder liners were also measured to find the amount of wear of the soft liners. The diameter of the liners used with the K-1000F coating increased 0.00016 inches. The liners used with the K-1000C coating increased 0.00018 inches. Thus, it can be seen that the liners used with the piston rings coated with K-1000F coating of the present invention had less wear than those liners used with piston rings coated with K-1000C coating.

The K-1000F coating when made in accordance with this invention is superior to the coating of the prior art such as coating K-1000C. The reason is believed to be that the hexagonal atomic crystalline structure is maintained by the cobalt molybdenum particle when it is alloyed with the other ingredients. The K-1000C coating, which has a substantial amount of pure molybdenum and no cobalt, has a body centered cubic atomic crystalline structure rather than the hexagonal crystalline structure in the K-1000F coating. Because of the hexagonal crystalline structure of cobalt, and in particular, the cobalt molybdenum alloy particle, substantially better wear properties were obtained by using the K-1000F coating.

In test number two, three piston rings having the K-1000F coating of the present invention were again installed as top compression rings in three of the pistons of the same diesel engine as used in test number 1. Three top compression rings were also prepared having a K-1000C coating and were installed on the other three pistons of the diesel engine. The diesel engine again developed 430 H.P. and 191 BMEP at 2,000 RPM. In this test, the engine was run for 611.5 hours with all the piston rings. After the test, the piston rings were removed and their end clearance measured to determine the increase in end clearance, thus showing the amount of wear of the piston rings. The rings coated with K-1000F had an average end clearance increase of 0.0056 inches. The piston rings coated with K-1000C had an average end clearance increase of 0.0079 inches. Thus, the piston rings coated with the K-1000C coating again showed a remarkably high wear rate compared to the piston rings coated with the K-1000F coating. The cylinder bore liners were also measured for wear. The liners used with the K-1000F increased by 0.00017 and those used with K-1000C increased by 0.00045 inches. Thus, it can be seen that in test two the liners used in conjuction with piston rings having the K-1000C coating wore considerably more than those used with K-1000F.

In the third test, three piston rings were again prepared with the K-1000F coating of the present invention and installed as the top compression ring in three pistons of the diesel engine used in the first and second tests. Also, three rings were prepared having the K-1000C coating and these were installed on the other three pistons of the diesel engine. In this test, the engine was run as before for 210.8 hours for all rings. After the test, the rings were removed and their end clearance increase measured to find the amount of wear. The average end clearance increas of the piston rings having the K-1000F coating was 0.00143 inches and the increase of the piston rings having the K-1000C coating was 0.00297 inches. Thus, it can again be seen that there was a substantial increase in wear of the piston rings having K-1000C coating compared to those having the K-1000F. The cylinder liner diameter was also measured for wear. Those liners that were used with piston rings having the K-1000F coating showed an average increase of 0.00013 inches while those liners associated with those piston rings coated with the K-1000C coating showed an average increase of 0.00023 inches. Thus, it can be seen that the K-1000F coating caused far less wear of the liners than those used in conjunction with the piston rings coated with the K-1000C coating.

On the basis of the foregoing tests, the coating of the present invention was judged to be better since less ring wear and less liner wear occurred. The reason for the remarkable difference in the wear rates of the two coatings is attributed to the decrease in the amount of molybdenum and the addition of the cobalt molybdenum alloyed particles used in the starting mixture. The K-1000C coating maintained a body centered cubic crystalline structure throughout the test which inherently results in higher friction and wear than a hexagonal crystalline structured metal. In addition, the high wear rates of K-1000C can also be attributed to the highly abrasive molybdenum oxides formed at temperatures above 400°F. The K-1000F coating of the present invention has exceptionally good wear properties as shown by the engine tests, and this is attributed to the fact that the coating maintained a hexagonal crystalline structure throughout the tests. The results obtained show that the K-1000F coating produced less ring wear and less cylinder wear than the K-1000C coating. In addition, abrasive molybdenum oxides will not form as long as the crystalline structure is hexagonal and thus the K-1000F coating does not contain abrasive particles. Thus, it can be seen that by decreasing the molybdenum content of the coating and by adding the cobalt molybdenum alloy particles to the coating, better wear rates were obtained.

From the foregoing, it has been concluded that the preferred amount of molybdenum should not be in excess of 60% and the amount of cobalt molybdenum alloy particles should not be less than 6.7% to insure that the coating maintains its hexagonal crystalline structure throughout wide temperature ranges present in current diesel engines.

Accordingly, the invention having been described in its best embodiment and mode of operation, that which is desired to be claimed by Letters Patent is:

1. A bearing member having a wear resistant coating applied to a wear surface thereon by plasma spraying a mixture of particles on said wear surface, said mixture comprising by weight:
   15–40% intermetallic brazing and binding alloy particles,
      said particles consisting of:
         0.18 – 0.48 parts carbon,
         0.60 – 1.60 parts silicon,
         2.58 – 6.88 parts chromium,
         10.50 – 28.00 parts nickel,
         0.60 – 1.60 parts iron, and
         0.54 – 1.44 parts boron;
   5–30% cobalt molybdenum alloy particles,
      said cobalt molybdenum alloy particles consisting substantially of 75% cobalt alloyed with 25% molybdenum; and
   30 – 60% molybdenum particles.

2. The bearing member of claim 1 wherein the weight percentage of said brazing and binding alloy particles is substantially 25 – 35%.

3. The bearing member of claim 1 wherein the weight percentage of said cobalt-molybdenum alloy particles is substantially 6.7 – 16.7%.

4. The bearing member of claim 1 wherein the weight percentage of said molybdenum particles is substantially 50 – 58.3%.

5. The bearing member of claim 1 wherein the weight percentage of said brazing alloy particles is substantially 35%, 6. The bearing member of claim 1 wherein the weight percentage of said cobalt-molybdenum alloy particles is substantially 6.7%.

7. The bearing member of claim 1 wherein the weight percentage of said molybdenum particle is substantially 58.3%.

8. The bearing member of claim 1 wherein the porosity of said coating is substantially 0–15%.

9. The bearing member of claim 8 wherein said porosity of said coating is substantially 5%.

10. The bearing member of claim 1 wherein the average diameter of said particles is from 5 to 100 microns.

11. A piston ring having a bearing face coated with a wear resistant alloy, said alloy obtained by plasma spraying a mixture of particles substantially comprising by weight:
   35% intermetallic brazing and binding alloy particles,
      said particles consisting of:
         0.4 parts carbon,
         1.4 parts silicon,
         6.0 parts chromium,
         24.5 parts nickel,
         1.4 parts iron, and
         1.3 parts boron;
   6.7% cobalt molybdenum alloy particles, of which 5 parts is cobalt and 1.7 parts is molybdenum; and
   58.3% molybdenum particles.

* * * * *